J. ADAMS.
ROTARY CYLINDER INTERNAL COMBUSTION ENGINE.
APPLICATION FILED MAR. 26, 1914.

1,236,643.

Patented Aug. 14, 1917.
3 SHEETS—SHEET 2.

Witnesses.
Percy M. Gordwin.
Edwin C. Ale

Inventor.
Jordan Adams.
by His Attorney
Benj. Thos King.

UNITED STATES PATENT OFFICE.

JORDAN ADAMS, OF LONDON, ENGLAND.

ROTARY-CYLINDER INTERNAL-COMBUSTION ENGINE.

1,236,643.  Specification of Letters Patent.  Patented Aug. 14, 1917.

Application filed March 26, 1914. Serial No. 827,473.

*To all whom it may concern:*

Be it known that I, JORDAN ADAMS, a subject of the King of Great Britain and Ireland, and resident of London, England, have invented certain new and useful Improvements in and Relating to Rotary-Cylinder Internal-Combustion Engines, of which the following is a specification.

This invention relates to improvements in four-cycle internal combustion engines of the radial rotating cylinder type.

To this end the invention has in view certain novel features of construction in engines of this character wherein the explosive mixture is drawn into the crank chamber through a hollow crank shaft, and from there conveyed through ports in the crank chamber wall to an annular chamber outside of the crank case. From this chamber the mixture is then passed by means of suitable pipes or the like to the cylinder through the inlet valve in each of the cylinder heads, by means of specially designed controlling devices.

Accordingly, the invention also has in view a novel valve arrangement, and novel valve actuating devices which greatly improve the structural features of the engine, and enable the diameter of the same to be reduced.

A further object is to provide a novel, simple and practical arrangement of instrumentalities, whereby the efficiency of the engine is materially increased, and all of the parts are capable of coöperation in a positive and reliable manner.

With the above and other objects in view which will more readily appear as the nature of the invention is better understood, the same consists in the novel construction, combination and arrangement of parts hereinafter more fully described, illustrated and claimed.

In order that my invention may be completely understood reference should be made to the accompanying sheets of drawings which illustrate practical manners of carrying my invention into effect, the engine being provided with seven radial cylinders.

Figure 5:
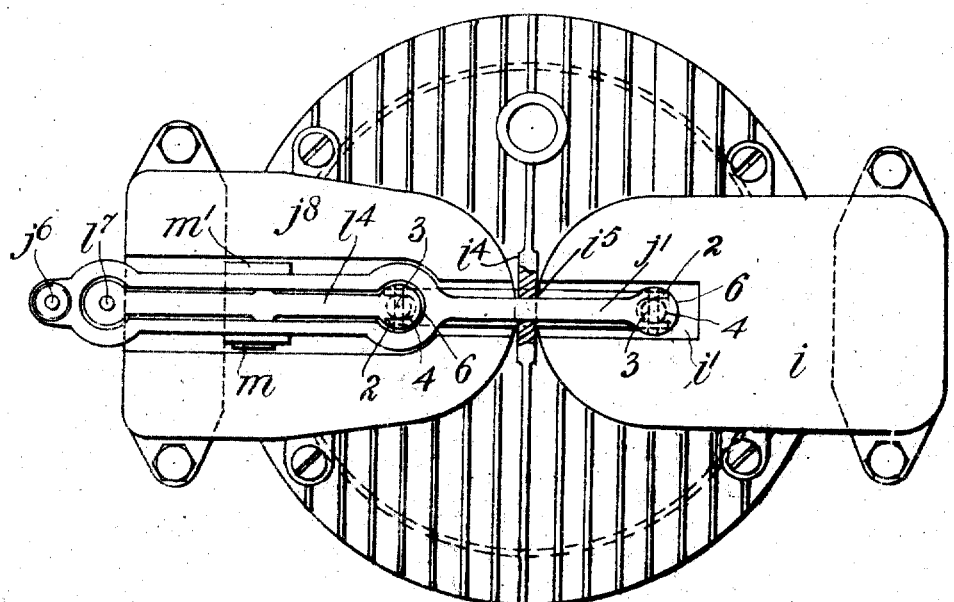

Fig. 5 a plan view also illustrative of modifications hereinafter referred to.

$a$ is the reference letter for all the cylinders, $b$ for all the pistons, $c$ the connecting rods, $d$ is the crank pin, and $e$ is the crank shaft, one end of which is hollow having the duct $e'$, for the conveyance of the mixture to the crank chamber $f$ in known manner. The mixture is conveyed from the crank chamber $f$ through ports in the wall thereof indicated by the arrow to the annular chamber $g$ thence by the pipes $h$ to the inlet valve box $i$ by the inlet valve $j$ to the combustion chamber. The recess $i'$ is formed in the valve box $i$ within which the end of the lever $j'$ oscillates. The valve stem or spindle has two guides, that formed in the cylinder head $k$, and that in the recessed wall of the valve box, the spring $j^2$ being fitted between them.

The inlet valve box is secured by the bolts $i^2$, $i^2$ to the top cooling web plate, and by the screw $i^3$ to the central cooling web of the cover.

The cylinder cover $k$ fits within the cylinder and is secured on the inner side by a flange $k'$ formed integrally with and inside the cylinder, and on the outer side by an annular nut $k^2$, whose thread fits a thread formed on the inside of the cylinder.

Figure 3:
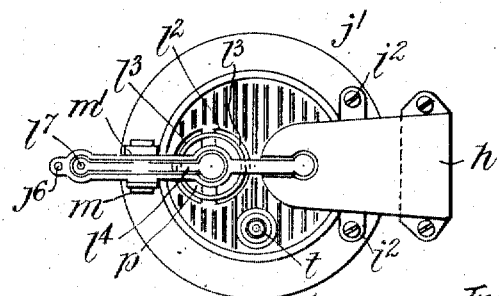
Fig. 3 is a plan of a cylinder head.

The stem of the exhaust valve $l$ fits within a guide $l'$ formed integrally with the cover plate $k$. This guide is held by the diametral bar $l^2$ (Fig. 3) dividing the outlet for the exhaust gases into two ports $l^3$, $l^3$. This valve is operated by the lever $l^4$ mounted on the same fulcrum pin $m$ as the said lever $j'$. The lever $l^4$ fits within a longitudinal slot formed in the lever $j'$, and both levers being mounted on the same fulcrum pin $m$, the lever $j'$ having two bearings thereon, they operate in one plane. In this manner the two valves diametrally arranged are operated by the two push rods $l^5$ and $j^4$ in the same plane, and the push rods may be operated as shown by the cams $l^6$ and $j^7$ on the same sleeve $n$, the axis of which is also in the same plane. The said cams, sleeve and gear wheels are integrally formed, and are mounted on the fixed pin $o$ secured in the crank chamber wall.

The push rods $l^5$ and $j^4$ are each provided at their upper ends with a cap having a rounded or curved shoulder, and projecting from the center of each rounded shoulder are pins $l^7$, $j^6$ which loosely fit a hole in the outer ends of each lever, each of the said pins thus pass through the lever.

At the other or inner ends of each push rod a ball is fitted to take the friction of the cam.

The fulcrum pin $m$ is mounted in an eye bolt or carrier $m'$ secured by nuts in the upper annular cooling webs of the cylinder.

The conical deflector or shield $p$ is fitted to the guide $l'$ of the exhaust valve $l$ in order to protect the spring from the heat of the hot exhaust gases passing outwardly through the ports $l^3$, $l^3$ in the cover $k$.

Figure 1:
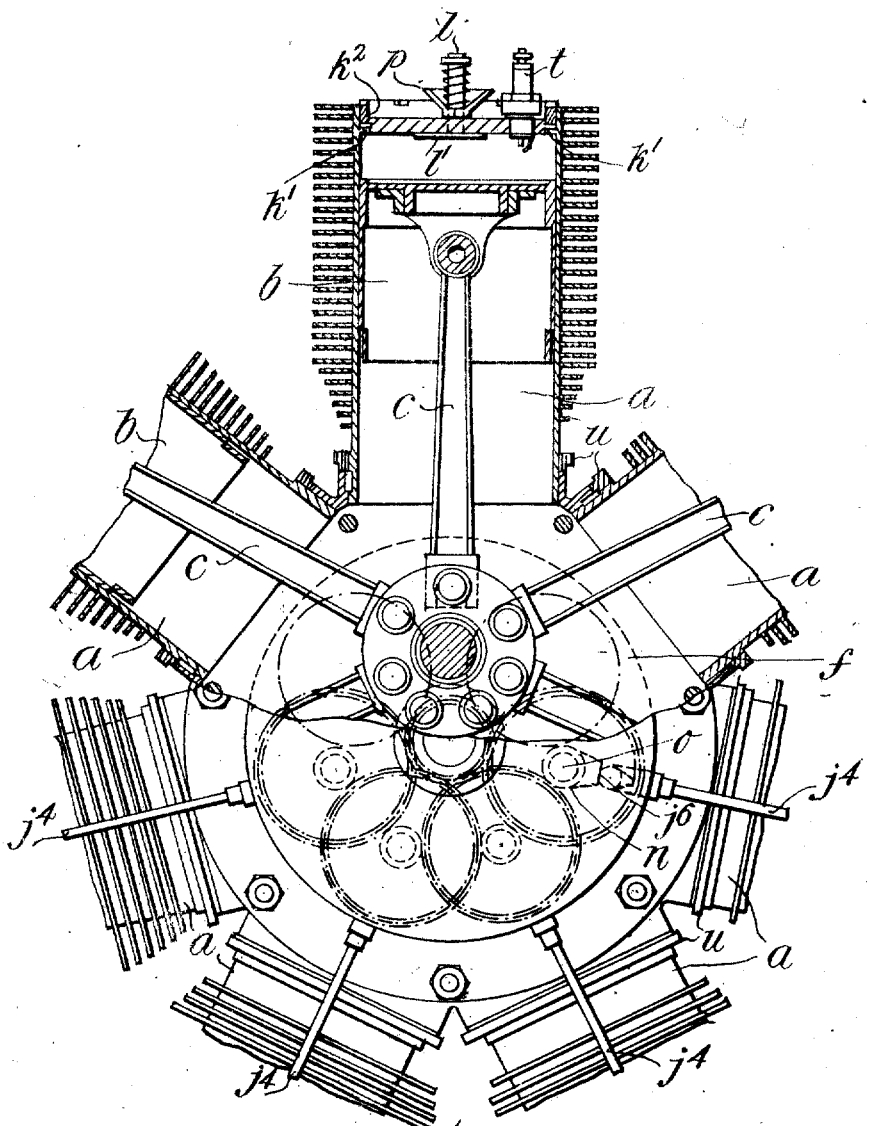
Figure 1 is a part elevation, part section, in the plane of the cylinders.
Figure 2:
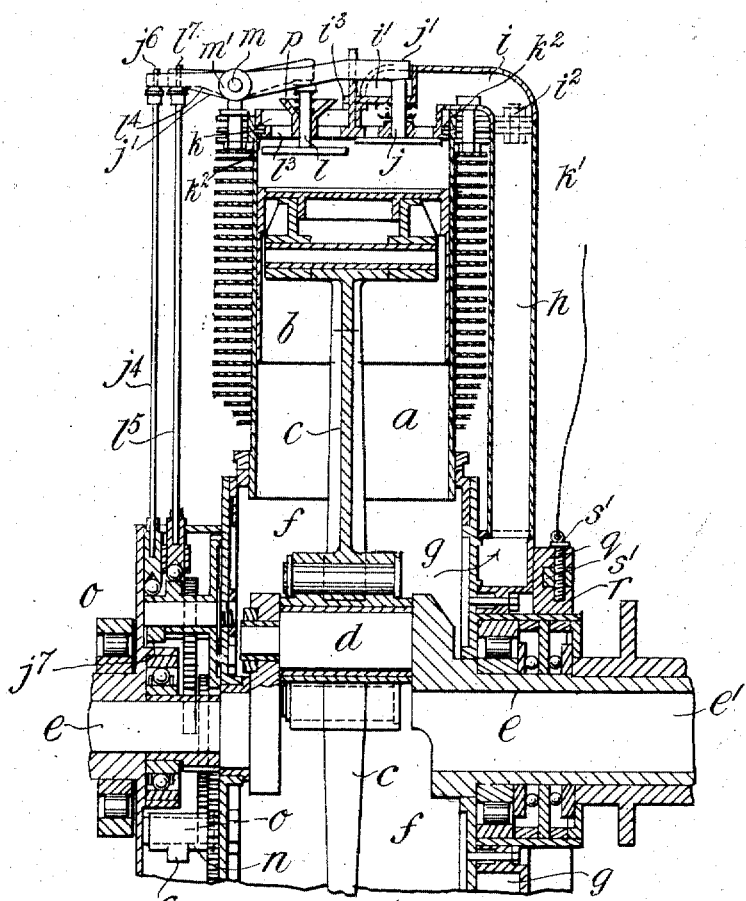
Fig. 2 is a section through one of the cylinders and axially through the crank shaft.

Referring to Fig. 2, $q$ is the distributing plate controlling and timing the ignition of the engine. The plate $q$ is annular and is formed of suitable non-conducting material. It is secured to the outer casing $r$ of the bearing. A conducting block of metal $s$ is inserted in a recess formed in the distributing plate to receive it, and the eye screw $s'$ is screwed through the metal block. The wire for connection to the spark plug $t$ is secured in the eye of the screw.

The cylinders $a$, $a$ are formed with a thread on their inner ends and are screwed into corresponding threads in the crank chamber and then locked by the annular nuts $u$, $u$.

Figure 4:
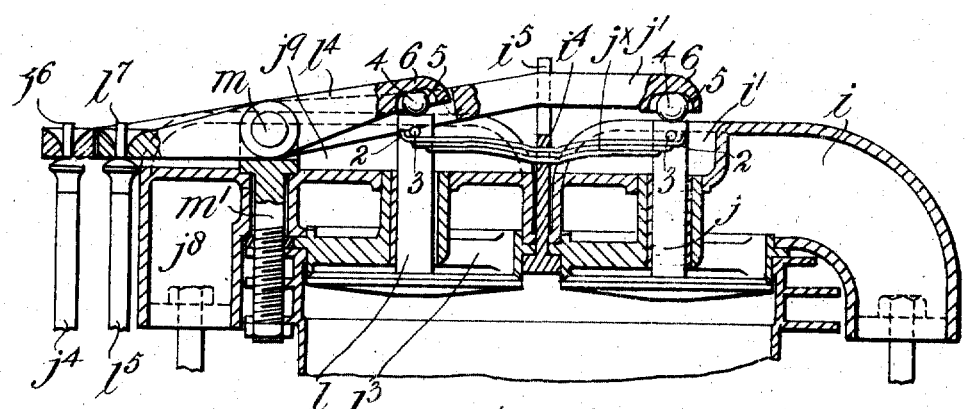
Fig. 4 is a part vertical section of a modified construction.

Referring now to the modification shown in Figs. 4 and 5, $j^8$ is the exhaust valve box which is provided with the depression or recess $j^9$ through which extends the exhaust valve spindle $l$, this recess or depression $j^9$ serving also for the accommodation of the rocking levers $l^4$, $j'$, the exhaust box $j^8$ being connected suitably to any convenient form of silencer, either rotating with the cylinder or stationary.

The two valves, the inlet valve $j$ and the exhaust valve $l$ are closed and kept closed by means of the leaf or blade spring $j^x$ until such time as they are opened by their rocking levers. This spring $j^x$ may consist of one or several plates and be rigidly secured to the central web $i^4$ of the cylinder head, or to a bracket thereon, or it may be pivotally mounted thereto so that said spring may have a certain degree of rocking movement upon its pivot, in such manner that the arms of said spring are of equal length. Each end of this centrally mounted spring $j^x$ is forked or slotted at its end 2 to embrace the valve spindles $j$, $l$, and said forked ends 2 press against pins 3 in the valve spindles $j$, $l$, or against a nut on said spindles provided with a rounded projecting portion to contact with the aforesaid forked ends of the spring.

4, 4 are balls adapted to contact with the top ends of the valve spindles $j$, $l$, said balls being held within or partly embraced by recesses 5 at the ends 6 of the rocking levers $j'$, $l^4$, said recesses being slotted or longer in the longitudinal direction of the levers than in the lateral to allow of the slight rolling movement of the balls 4 owing to the rocking of the levers $j'$, $l^4$.

To prevent any side rock, the longer or inlet valve lever slides within slotted guides $l^5$ which are preferably formed in the central web $i^4$, but said guides may be otherwise arranged.

Having now described my invention, what I claim as new and desire to secure by Letters Patent of the United States is:—

1. An engine of the class described including in combination, a cylinder having inlet and exhaust ports in the head thereof, valves for said inlet and exhaust ports, an upstanding lever guide member carried by the cylinder head and located between said ports, and separate inlet and exhaust valve operating levers nested one within the other and having a common fulcrum point, said inlet valve lever working in said guide member.

2. An engine of the class described including in combination, a cylinder having inlet and exhaust ports in the head thereof, a casing secured to the cylinder head and communicating with said inlet port, said casing having a lever clearance recess, spring-seated inlet and exhaust valves for said ports, an upstanding lever guide member located between said ports, and separate levers nested one within the other and having a common fulcrum point for operating said valves.

3. In an engine of the class described, the combination with a cylinder having intake and exhaust ports in the head thereof, of inlet and exhaust valve boxes carried by said cylinder head and communicating with said ports, said boxes having lever clearance recesses therein, inlet and exhaust valves for said ports and having their spindles exposed in said recesses of the inlet and exhaust valve boxes, a lever guide member located between said valves, a spring fastened in said member and connected with the spindles of said valves, independent intake and exhaust valve levers nested one within the other and having a common fulcrum point, said levers working in the lever clearance recesses of the said boxes to engage the valve spindles.

In testimony whereof I have affixed my signature in presence of two witnesses.

JORDAN ADAMS.

Witnesses:
ROBT. HUNTER,
BENJ. THOS. KING.